(12) United States Patent
Männl

(10) Patent No.: US 10,396,610 B2
(45) Date of Patent: Aug. 27, 2019

(54) LAMINATED CORE ARRANGEMENT AND ELECTRIC MACHINE WITH SUCH A LAMINATED CORE ARRANGEMENT

(71) Applicant: Siemens Aktiengesellschaft, München (DE)

(72) Inventor: Andreas Männl, Nüdlingen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/943,353

(22) Filed: Apr. 2, 2018

(65) Prior Publication Data

US 2018/0226849 A1     Aug. 9, 2018

Related U.S. Application Data

(63) Continuation of application No. 14/794,388, filed on Jul. 8, 2015, now abandoned.

(30) Foreign Application Priority Data

Jul. 10, 2014 (EP) ..................................... 14176560

(51) Int. Cl.
    H02K 1/27           (2006.01)

(52) U.S. Cl.
    CPC ............. *H02K 1/278* (2013.01); *H02K 1/274* (2013.01); *H02K 1/2706* (2013.01); *H02K 1/2753* (2013.01); *H02K 2201/06* (2013.01)

(58) Field of Classification Search
    CPC ...... H02K 1/27; H02K 1/2706; H02K 1/2726; H02K 1/274; H02K 1/2753; H02K 1/278; H02K 2201/06

USPC ........... 310/156.38, 156.01, 156.47, 156.41, 310/156.79; 29/596

See application file for complete search history.

(56) References Cited

U.S. PATENT DOCUMENTS

| 4,629,920 A | 12/1986 | Hermann |
| 4,642,502 A | 2/1987 | Carpenter |
| 7,071,592 B1 | 7/2006 | Lu |

(Continued)

FOREIGN PATENT DOCUMENTS

| CN | 202142920 U | 2/2012 | ............ H02K 1/22 |
| CN | 202634111 U | 12/2012 | ............ H02K 1/27 |

(Continued)

OTHER PUBLICATIONS

Okada Hidenori; Niizaki Satoru, Buried Magnet Rotor, Jun. 15, 2006, Honda Motor CO., JP 2006158037 (English Machine Translation).*

(Continued)

*Primary Examiner* — Quyen P Leung
*Assistant Examiner* — Alexander A Singh
(74) *Attorney, Agent, or Firm* — Henry M. Feiereisen LLC

(57) ABSTRACT

A laminated core arrangement for an electric machine includes a laminated core having at least two part cores which are arranged in an axial direction. Each of the part cores has a plurality of polygonal individual sheets, with at least one of the individual sheets being round and disposed between the part cores. The at least one round individual sheet has a diameter which is less than or equal to an inner circle of the polygonal individual sheets. Permanently-excited magnets are disposed around a circumference of the laminated core.

8 Claims, 2 Drawing Sheets

(56) References Cited

U.S. PATENT DOCUMENTS

2010/0133939 A1  6/2010  Takemoto
2016/0020653 A1  1/2016  Ueda

FOREIGN PATENT DOCUMENTS

| CN | 102891550 A | 1/2013 | ............ H02K 1/22 |
| DE | 100 16 002 A1 | 11/2000 | |
| DE | 100 100 91 A1 | 9/2001 | |
| DE | 10 2006 049 866 A1 | 4/2008 | |
| JP | 2006158037 A * | 6/2006 | |
| WO | WO 2008/110542 A1 | 9/2008 | |

OTHER PUBLICATIONS

Chinese Search Report dated Mar. 26, 2018 with respect to counterpart Chinese patent application 201510400826.1.
Translation of Chinese Search Report dated Mar. 26, 2018 with respect to counterpart Chinese patent application 201510400826.1.

* cited by examiner

LAMINATED CORE ARRANGEMENT AND ELECTRIC MACHINE WITH SUCH A LAMINATED CORE ARRANGEMENT

CROSS-REFERENCES TO RELATED APPLICATIONS

This application is a continuation of prior filed copending U.S. application Ser. No. 14/794,388, filed Jul. 8, 2015, the priority of which is hereby claimed under 35 U.S.C. § 120 and which claims the priority of European Patent Application, Serial No. EP 14176560.2, filed Jul. 10, 2014, pursuant to 35 U.S.C. 119(a)-(d), the disclosures of which are incorporated herein by reference in their entireties as if fully set forth herein.

BACKGROUND OF THE INVENTION

The present invention relates to a laminated core arrangement for an electric machine and to an electric machine with such a laminated core arrangement.

The following discussion of related art is provided to assist the reader in understanding the advantages of the invention, and is not to be construed as an admission that this related art is prior art to this invention.

Servo motor armatures are known to have a polygonal laminated core which is equipped around the entire circumference with permanently-excited small plate magnets and is bandaged with a glass fiber tape. The laminated core in such cases has two end sides: a drive side (drive end) and a brush side (non-drive end). In particular an end sheet, which is usually larger than the remaining sheets, is provided at one of the end sides. Such armatures are subsequently magnetized at an angle.

However such an arrangement also has disadvantages. In particular pole gaps are encountered between the poles magnetized at an angle. Since the armature is provided with magnets over the entire circumference this results in magnet material which is unmagnetized.

It is also known to save unused magnet material by pole gaps which are unequipped. The armature is hereby constructed in stages, i.e. the laminated core has at least two part cores in the axial direction behind one another, which are rotated in relation to one another. In this construction the part cores are designed large enough for the magnets with maximum dimensions to be able to be attached. This means that the overall core must be lengthened since otherwise the magnets would collide with the edges at the transition of the individual part cores. Since not all magnets have the maximum possible size, this layout produces gaps between the individual magnets. This leads, in turn, in the subsequent bandaging process to enabling the bandage to be drawn in between the magnets and thereby cause displacement of individual magnets. This adversely affects electromagnetic values of the motor.

It would therefore be desirable and advantageous to provide an improved laminated core arrangement and improved electric machine to obviate prior art shortcomings and to have compact design while yet being reliable in operation.

SUMMARY OF THE INVENTION

According to one aspect of the present invention, a laminated core arrangement for an electric machine includes a laminated core having at least two part cores arranged in an axial direction, each of the part cores having a plurality of polygonal individual sheets, with at least one of the individual sheets being round and disposed between the part cores, said at least one round individual sheet having a diameter which is less than or equal to an inner circle of the polygonal individual sheets, and permanently-excited magnets disposed around a circumference of the laminated core.

According to another aspect of the present invention, an electric machine includes a laminated core arrangement having a laminated core including at least two part cores arranged in an axial direction, each of the part cores having a plurality of polygonal individual sheets, with at least one of the individual sheets being round and disposed between the part cores, said at least one round individual sheet having a diameter which is less than or equal to an inner circle of the polygonal individual sheets, and permanently-excited magnets disposed around a circumference of the laminated core The invention is based on the idea of fitting sheets with a round external contour, of which the outer diameter is smaller than the diameter of the inner circle of the adjacent polygonal individual sheets or corresponds at a maximum to the diameter of the inner circle at the contact points of the part cores. Therefore indentations occur between the part cores around the circumference of the laminated core which can be covered by the magnets. The edges at the transition of the individual part cores thus no longer cause problems, through which a magnet overhang caused by magnet tolerances is possible. The polygonal individual sheets especially involve regular polygons, in which at least the sides on which a magnet is attached and which are touched by the inner circle of the polygon are the same length.

Because of the transition in the area of the round individual sheets between the part cores, the magnet tolerances are absorbed, so that the part cores are designed shorter, since the small plate magnets with maximum tolerance no longer collide with the next part core. The shorter part cores make a more compact design possible, wherein the increased length in the direction of the open end side is less or does not arise.

According to another advantageous feature of the present invention, the magnets adjacent to the at least one round individual sheet can touch each other. This reduces the gaps between the magnets or there are no gaps present. This especially has the positive effect that the glass fiber bandage cannot be drawn in between the magnets. As a result, the risk of magnets being displaced, which has a negative influence on the electromagnetic values of the motor, is reduced.

According to another advantageous feature of the present invention, the magnets can be sized to project beyond the part core at at least one end side of the laminated core. As a result, the laminated core arrangement has an especially compact layout. This is made possible by the added space generally being available at the open end side which is not defined by an end sheet. Also conceivable are configurations of the laminated core arrangement in which no end sheet is provided, so that both the drive side and also the non-drive side are open and the magnets project beyond the respective part core on both end sides.

According to another advantageous feature of the present invention, the part cores can be rotated in relation to one another. This saves magnet material.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
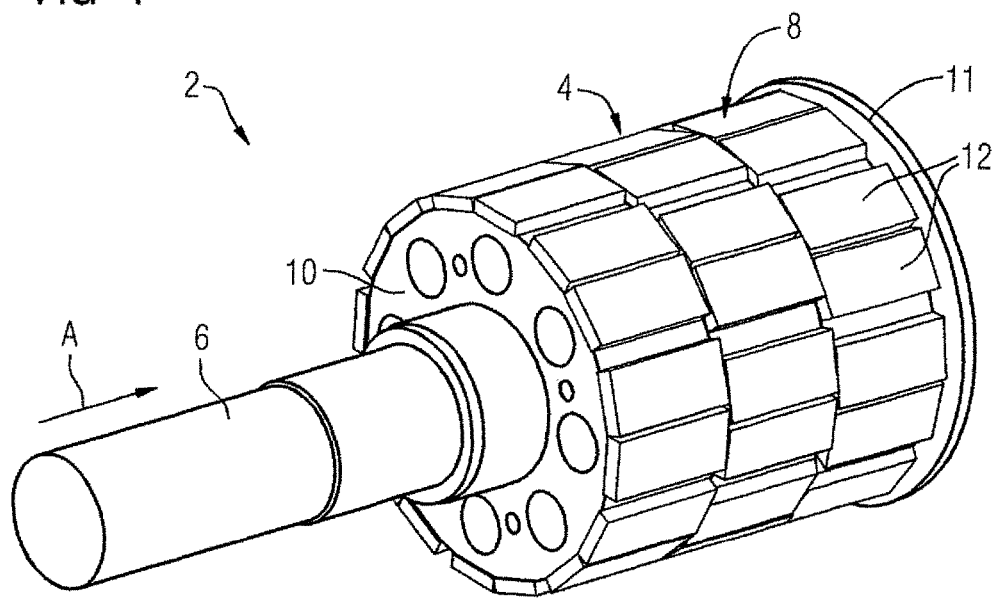
FIG. 1 shows a perspective illustration of an armature equipped with magnets.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective illustration of an armature, generally designated by reference numeral 2 and including a laminated core arrangement 4 which is mounted on a shaft 6. The laminated core arrangement 4 is composed of a laminated core 8 and a plurality of permanently-excited magnets 12. The laminated core 8 is formed by a plurality of polygonal individual sheets 10 which are disposed behind one another in an axial direction A. The permanently-excited magnets 12 are disposed in a number of rows around the circumference of the laminated core 8. In the assembled state of the armature 2 the laminated core arrangement 4 is bandaged with a glass fiber tape not shown here.

To ensure clarity, it is necessary to establish the definition of several important terms and expressions that will be used throughout this disclosure. The term "polygonal" is understood here as the individual sheets being embodied in each case as a type of regular polygon so that they have a number of equal sides and equal internal angles. The term "inner circle of the polygon" Is understood as the circle which at least touches the sides of the polygon on which the magnets are disposed, on its inside (and not their extensions).

Figure 2:
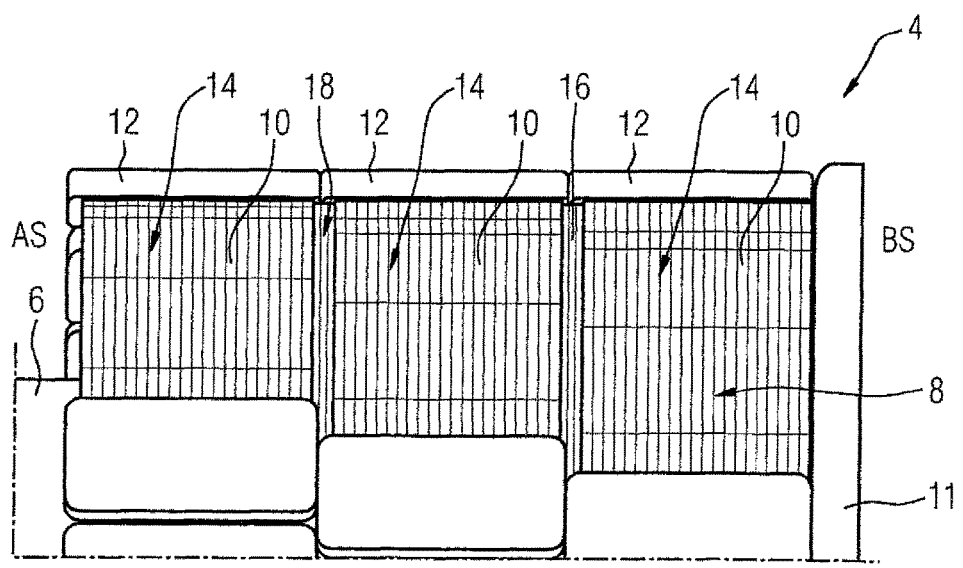
FIG. 2 shows an enlarged plan view of a laminated core arrangement of the armature according to FIG. 1.

As can be seen from FIG. 2, the polygonal individual sheets 10 are grouped into a number of part cores 14 which are rotated in relation to one another. The polygonal individual sheets 10 of a part core 14 are all the same in respect of their external contour and size and are also arranged behind one another to cover the same area, so that the corners of the polygons form edges around the circumference of the part core 14 which extend in the axial direction.

The term "rotated in relation to one another" is to be understood here that, although the individual sheets within a part core 14 have the same structure, the part cores 14 are not disposed in relation to one another in the axial direction A to cover the same area, so that the edges around the circumference of the part cores 14 do not lie in a line.

The armature 2 has a drive end AS and a non-drive end BS. At the non-drive end BS, in the exemplary embodiment shown, the laminated core arrangement 4 is provided with an end sheet 11. At the drive end AS the laminated core arrangement 4 is open.

Figure 3:
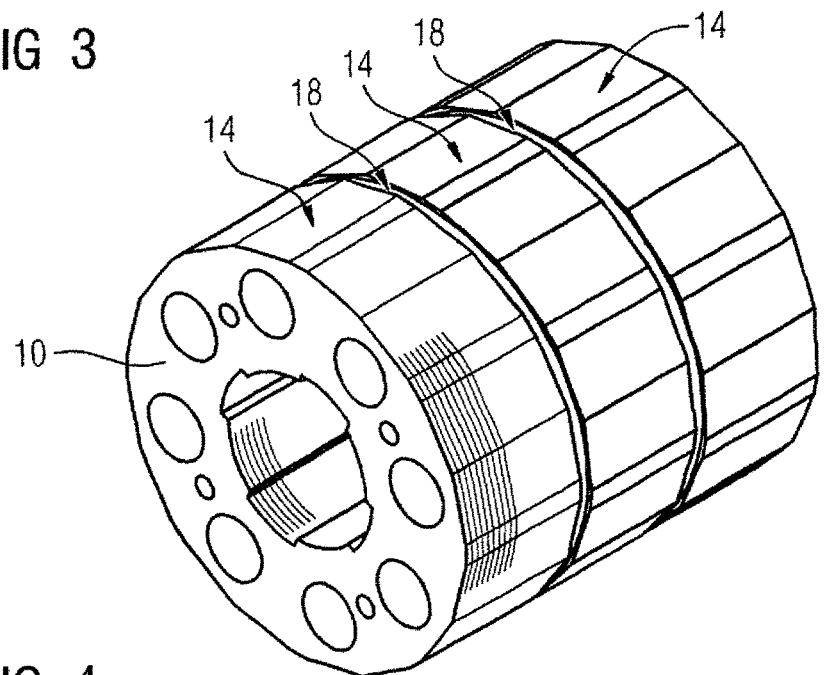
FIG. 3 shows a perspective illustration of a detail of the laminated core according to FIG. 1.
Figure 4:
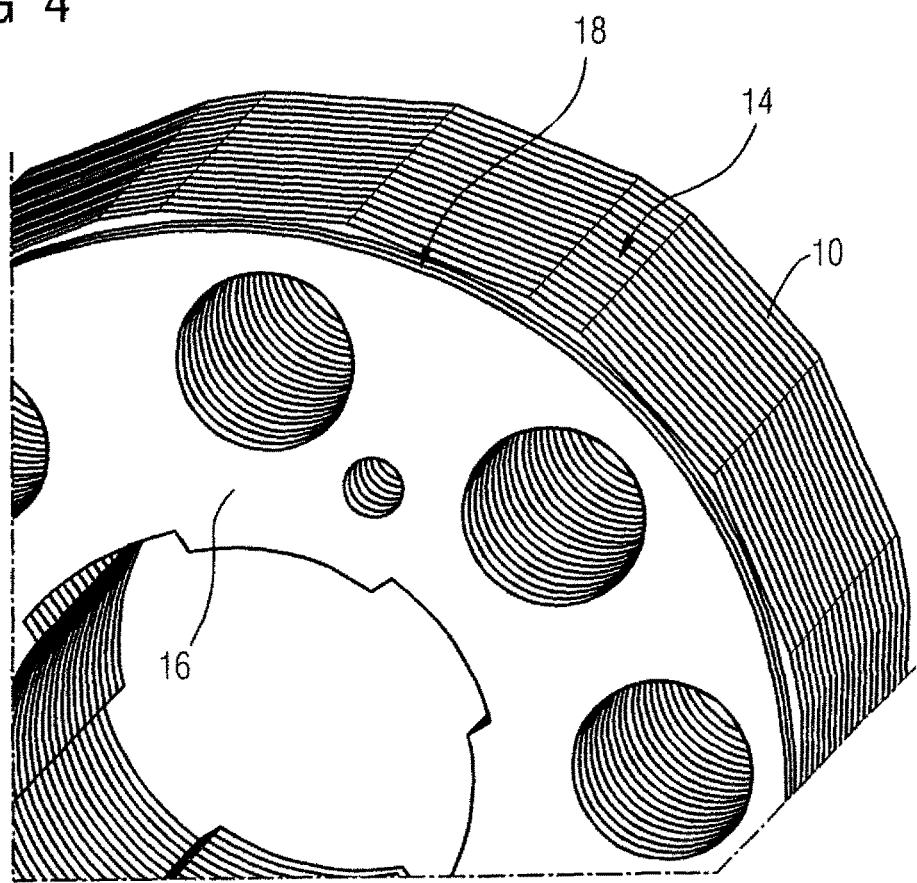
FIG. 4 shows a cutaway view, on an enlarged scale, of a part core with adjoining round sheets.

Round individual sheets 16 are provided between the part cores 14. The round individual sheets 16 have a diameter which is smaller than or corresponds to a maximum of the diameter of the inner circle of the polygonal individual sheet 10. Thus indentations 18 are formed on the surface of the laminated core 4 around its circumference between the part cores 14, which represent transitional areas between the part cores 14. These can be seen especially well in FIG. 2, FIG. 3 and FIG. 4.

The indentations 18 especially are comprised of one or more round individual sheets 16, depending on the size of the magnet tolerances to be compensated for.

The transition areas which are formed by the round individual sheets 16 serve especially to compensate for magnet tolerances. This is shown in FIG. 2. The individual magnets 12, which extend over the part cores 14 in the axial direction, butt against each other in the area of the round sheets 16. This makes a compact design of the laminated core 4 possible and no gaps arise between the magnets 12 into which a bandage around the circumference of the laminated core 4, not shown here in any greater detail, can be sucked.

It can also be seen from FIG. 2 that the magnets 12 of the laminated core arrangement 4 project in the area of the drive side AS of the armature 2 beyond the outermost part core 14 and thus the laminated core 8.

For reasons of uniformity it is also possible, for the production of the laminated core arrangement, to provide individual sheet modules which each are comprised of a part core 14 and one or more round individual sheets 16. By arranging the prefabricated modules behind one another the laminated core 8 is manufactured in a simple manner. The open end of the laminated core 8 is defined in this case by a series of round individual sheets 16.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of manufacturing a laminated core arrangement for an electric machine, comprising:
   providing a laminated core including at least two part cores arranged in an axial direction, with each of the part cores having a plurality of polygonal individual sheets and a plurality of round individual sheets disposed between the part cores, and the round individual sheets having a diameter which is less than or equal to an inner circle of the polygonal individual sheets and thereby forming indentations provided on a radially outer surface of the laminated core between the part cores and representing transitional areas between the part cores;
   bandaging permanently-excited magnets with a glass-fiber and disposing them around a circumference of the laminated core, so that the magnets adjacent to each of the round individual sheets touch each other and radially outwardly cover the individual sheets disposed between the part cores and the indentations provided on the radially outer surface of the laminated core between the part cores and representing transitional areas between the part cores forming from each of the part cores and at least one of the round individual sheets together a prefabricated module; and arranging a plurality of the thus formed prefabricated modules behind one another to simplify a manufacture of the laminated core.

2. The method of claim 1, further comprising sizing the magnets to project beyond the part core at at least one end side of the laminated core.

3. The method of claim 1, further comprising forming the part cores rotationally offset in relation to one another.

4. The method of claim 1, further comprising providing each of the prefabricated modules with more than one of the round individual sheets.

5. A method of manufacturing an electric machine, comprising:

providing a laminated core arrangement which has a laminated core including at least two part cores arranged in an axial direction, with each of the part cores having a plurality of polygonal individual sheets and a plurality of round individual sheets disposed between the part cores, said round individual sheets having a diameter which is less than or equal to an inner circle of the polygonal individual sheets and thereby forming indentations provided on a radially outer surface of the laminated core between the part cores and representing transitional areas between the part cores;

bandaging permanently-excited magnets with a glass-fiber and disposing them around a circumference of the laminated core, so that the magnets adjacent to each of the round individual sheets touch each other and radially outwardly cover the individual sheets disposed between the part cores and the indentations provided on the radially outer surface of the laminated core between the part cores and representing transitional areas between the part cores;

forming from each of the part cores and at least one of the round individual sheets together a prefabricated module; and arranging a plurality of the thus formed prefabricated modules behind one another to simplify a manufacture of the laminated core.

6. The method of claim 5, further comprising sizing the magnets to project beyond the part core at at least one end side of the laminated core.

7. The method of claim 5, further comprising forming the part cores rotationally offset in relation to one another.

8. The method of claim 5, further comprising providing each of the prefabricated modules with more than one of the round individual sheets.

* * * * *